US009803471B2

(12) United States Patent
Baxter et al.

(10) Patent No.: US 9,803,471 B2
(45) Date of Patent: Oct. 31, 2017

(54) SAFETY SIGNALS

(71) Applicant: AKER SUBSEA LIMITED, Maidenhead (GB)

(72) Inventors: Stephen Baxter, Maidenhead (GB); Robin Slater, Maidenhead (GB)

(73) Assignee: AKER SOLUTIONS LIMITED, London (GB)

( * ) Notice: Subject to any disclaimer, the term of this patent is extended or adjusted under 35 U.S.C. 154(b) by 98 days.

(21) Appl. No.: 14/415,081

(22) PCT Filed: Jul. 15, 2013

(86) PCT No.: PCT/GB2013/000303
§ 371 (c)(1),
(2) Date: Jan. 15, 2015

(87) PCT Pub. No.: WO2014/013211
PCT Pub. Date: Jan. 23, 2014

(65) Prior Publication Data
US 2015/0167450 A1 Jun. 18, 2015

(30) Foreign Application Priority Data
Jul. 16, 2012 (GB) .................................. 1212591.0

(51) Int. Cl.
*H04B 13/02* (2006.01)
*E21B 47/12* (2012.01)
(Continued)

(52) U.S. Cl.
CPC .......... *E21B 47/12* (2013.01); *E21B 33/0355* (2013.01); *H04L 27/2601* (2013.01)

(58) Field of Classification Search
CPC ............. E21B 33/0355; E21B 33/0375; E21B 34/045; E21B 34/066; E21B 34/10; E21B 34/16
See application file for complete search history.

(56) References Cited

U.S. PATENT DOCUMENTS

| 5,166,677 A | 11/1992 | Schoenberg |
| 2002/0101359 A1 | 8/2002 | Huckaba et al. |

(Continued)

FOREIGN PATENT DOCUMENTS

| EP | 1 355 037 | 10/2003 |
| EP | 2140622 B1 | 8/2011 |

(Continued)

OTHER PUBLICATIONS

UK Search Report dated Sep. 21, 2012 in GB1212591.0.
(Continued)

*Primary Examiner* — Brian Zimmerman
*Assistant Examiner* — Thomas McCormack
(74) *Attorney, Agent, or Firm* — Nixon & Vanderhye P.C.

(57) ABSTRACT

A subsea system comprises a multiplicity of subsea installations (M-1 . . . M-n) and a common transmission line (2a) in an umbilical for the conveyance of power or data communication electrical signals to the subsea installations. The system provides on the common transmission line a plurality of safety signals (T-1 . . . T-n) in the form of tones separate in frequency from each other and the other signals on the line. Each subsea installation is arranged to receive from the common transmission line selectively a respective one of the safety signals for the control of a fail-safe device (9) in the installation.

13 Claims, 5 Drawing Sheets

(51) Int. Cl.
*H04L 27/26* (2006.01)
*E21B 33/035* (2006.01)

(56) References Cited

U.S. PATENT DOCUMENTS

| | | | | |
|---|---|---|---|---|
| 2009/0079583 A1* | 3/2009 | Kent | ................... | E21B 33/0355 340/850 |
| 2010/0085210 A1 | 4/2010 | Bonavides et al. | | |
| 2010/0202541 A1* | 8/2010 | Carter | ................... | H04L 5/0044 375/257 |
| 2011/0137471 A1* | 6/2011 | Dailey, Jr. | ........... | E21B 33/0355 700/282 |

FOREIGN PATENT DOCUMENTS

| | | |
|---|---|---|
| GB | 2462942 B | 11/2011 |
| GB | 2462942 B8 | 11/2011 |
| WO | 91/16523 | 10/1991 |
| WO | WO 91/16523 | 10/1991 |
| WO | 2012/123694 A2 | 9/2012 |

OTHER PUBLICATIONS

International Search Report for PCT/GB2013/000303, dated Jul. 29, 2014, 4 pages.

Sten-Halvorsen, V. et al., "Electric actuators simplify subsea distribution systems—Offshore", Internet Citation, http://www.offshore-mag.com/articles/print/volume-64/issue-9/subsea/electric-actuators-simplify-subsea-distribution-systems.html, XP055130169, (Jan. 9, 2004).

* cited by examiner

SAFETY SIGNALS

This application is the U.S. national phase of International Application No. PCT/GB2013/000303, filed 15 Jul. 2013, which designated the U.S. and claims priority to GB Application No. 1212591.0, filed 16 Jul. 2012, the entire contents of each of which are hereby incorporated by reference.

FIELD OF THE INVENTION

This invention relates to the provision of safety signals to a system of subsea installations such as a plurality of subsea wells and the associated control and management equipment such as trees and control modules.

BACKGROUND TO THE INVENTION

A system of subsea installations is commonly connected for the supply of power and for the communication of data by way of an umbilical connection to an installation which may be onshore or may be a fixed or floating structure offshore. The umbilical connection may be very long (such as tens of kilometers) and may by means of multiple taps provide power to or data communication with a multiplicity of subsea installations. It is known to convey control and monitoring data by means of various transmission protocols (such as TCP/IP or a token bus protocol) and it is also known to convey data signals employing coding such as orthogonal frequency division multiplexing (OFDM) employing, for example, carrier frequencies in the range from 3 kHz to 45 kHz. It is also known to superimpose data signals on power lines, using at each end of a power line (such as a power line in an umbilical) a modem which is coupled to the power line by way of an appropriate combiner or separator as appropriate.

Owing to the harsh and occasionally hazardous conditions in which subsea installations operate it is desirable to provide redundancy in at least one and preferably both the communication of data to and from subsea installations and the supply of power to them. Thus control of the installations can be maintained at least temporarily despite the failure of, for example, a single communication link or a single power supply module.

However, it is desirable to provide in a subsea installation a fail-safe system in which a device such as an actuator is automatically put into a predetermined condition either in the event of failure of an electrical link to the installation or by deliberate action of a controller. The predetermined condition is usually one in which a control valve is closed, so as for example to prevent flow of production fluids. An actuator for this purpose may be electrically driven to an operative state (e.g. one in which a valve is opened) and require the continuous presence of an electrical signal to remain in that state; if this signal is interrupted the actuator immediately reverts to a predetermined ('fail-safe') condition. Examples of such actuators are disclosed in our international patent application published as WO2012/123694. In one example, a valve spindle is driven against the force of a restoring spring and latched in the operative state; the latch is electromagnetically maintained unless the maintaining signal is interrupted, whereupon the latch releases and the mechanical spring immediate drives the spindle to the fail-safe state. However, other forms of actuators may be used.

The provision of a safety signal, i.e. a signal of which the loss or substantial diminution (herein called 'inactive') will cause a device such as an actuator to enter the fail-safe state may be at least partly incompatible with a communication or power system that provides redundancy. Moreover, although the use of existing power and/or communication lines (herein called generically 'transmission lines') would be convenient for safety signals there is a problem of avoiding cross-talk either between safety signals and non-safety signals or between safety signals for different installations, especially if the safety signals are in a modulated format and have therefore a substantial bandwidth. It is important for safety signals to be specific to a particular installation or device and therefore any possible confusion between them should be avoided.

SUMMARY OF THE INVENTION

The present invention is therefore particularly concerned with a safety system in which a multiplicity of subsea devices can be governed by respective safety signals which can be conveyed over common transmission lines such as those in an umbilical connection without requiring complex coding and particularly in a manner which is compatible with redundancy of power supplies or data communications.

The present embodiments example of the invention are therefore particularly concerned with a safety system in which a multiplicity of subsea devices can be governed by respective safety signals which can be conveyed over common transmission lines such as those in an umbilical connection without requiring complex coding and particularly in a manner which is compatible with redundancy of power supplies or data communications.

A specific embodiment of the invention will now be described by way of example only and with reference to the accompanying drawings, in which.

DETAILED DESCRIPTION

Figure 1:
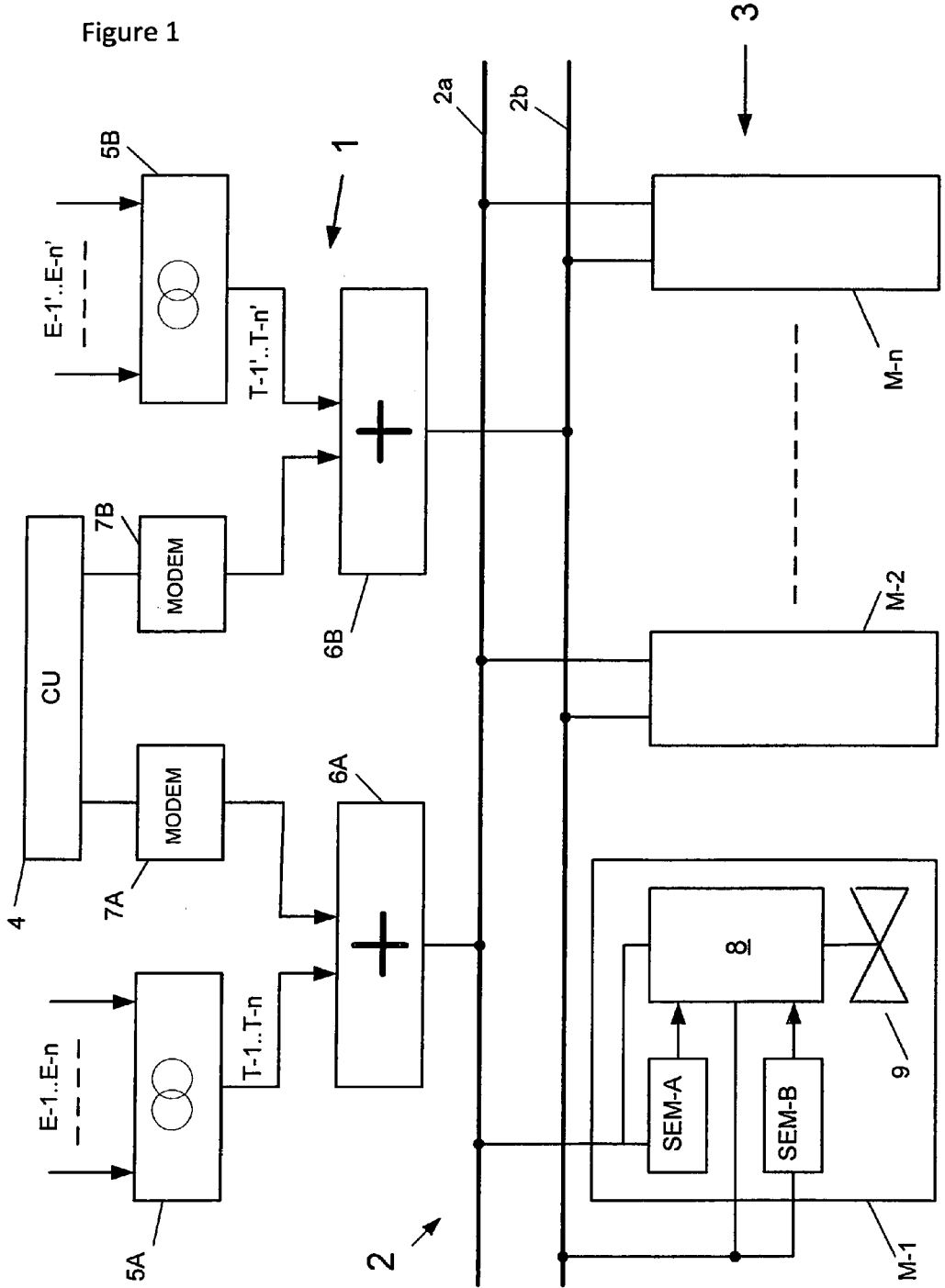
FIG. 1 is a schematic diagram of a safety system according to the invention.

FIG. 1 is a schematic diagram of a safety system for a multiplicity of subsea installations, particularly subsea control modules, denoted 'M-1' to 'M-n', in each of which is a fail-safe device, particularly in this example a fail-safe valve which is to be closed in the fail-safe state of the module.

Merely by way of example, when an output from respective logic in an SCM (subsea control module) is 'ON' the fail-safe valve is held open. In this state the valve enables the application of hydraulic pressure to directional control valves in order to open process valves for production fluid. When the logic output is 'OFF' the fail-safe valve closes and accordingly the process valves close.

The system of FIG. 1 has three main parts. One is the equipment 1, which is typically 'topside' (above the waterline) and may be on a fixed or floating structure. It comprises, among other things a control unit (CU) 4, tone generators 5A and 5B, combiners 6A and 6B and modems 7A and 7B. The equipment 1 is the principal source of control of the subsea system. A second part of the system is a subsea umbilical 2, which is represented in this example by two horizontal and parallel transmission lines 2a and 2b. The umbilical is (among other things) a common communication medium connecting the topside equipment 1 with the third part 3 of the system, namely the subsea control modules M-1 to M-n.

The control unit 4 may provide for transmission and reception, in generally known manner, of data communication to the subsea control modules. These signals may be relevant to control of the subsea control modules or the monitoring of components in the subsea control modules or equipment such as wells associated with them. These data communication signals are coupled via respective modems and combiners to each of the transmission lines 2a and 2b of the umbilical. Preferably, as shown, there are two distinct communication channels, denoted A and B, and data communication is sent redundantly (in known manner) so that each subsea control module can remain in data communication with the control unit 4 despite failure or partial failure of either channel.

Although the invention is not limited to any particular form of the non-safety signals (i.e. the data communication signals on channels A and B), one suitable format for transmission of these signals is OFDM as described for example in our GB patent No. 2462942. In its preferred form the transmissions are band-limited to the range from 3 kHz to 45 kHz. These signals may encode data in the form of packets according to any suitable protocol for example TCP/IP or a token system as described in our European patent EP-2140622.

The equipment 1 also includes two tone generators. One tone generator 5A provides n distinct tones T-1 to T-n, i.e. one for each of the n SCMs, which tones are by means of the respective combiner 6A superimposed on the communication line 2a which also carries the A communication signals. The other tone generator 5B likewise provides n tones T-1' to T-n', which by means of the respective combiner 6B are superimposed on the line 2b for the B communication channel. The tones for each particular subsea control module may be the same or different. Thus for example the tone T-1 may be the same as the tone T-1' or these tones may differ.

It is necessary to provide sufficient frequency separation between the tones and the communication signals. This is preferably ensured by band-width limitation of the communication signals and the set of tones. If the communication signals are as in the above example limited to the range 3 kHz to 45 kHz the tones may be in the range 50 kHz to 60 kHz. Since the tones are single frequency signals, which may be separated by intervals of (for example) 1 kHz, discrimination of a tone by means of a suitable narrow band filter (as will be described) is easily done.

The tone generators may each be controlled by a set of 'emergency shut-down' signals E-1 to E-n, one for each of the tones produced by the tone generators. In particular each tone generator will produce a particular tone (such as T-1) only if the corresponding emergency shut-down signal E-1 is active.

The communication (non-safety) and safety signals on the A and B channels are for each subsea control module (as shown only for the subsea control module M-1) received by a respective one of two subsea electronic modules SEM-A and SEM-B. These provide signals to a detection and logic circuit 8 controlling a fail-safe valve 9 as will be described with reference to FIG. 2.

Figure 2:
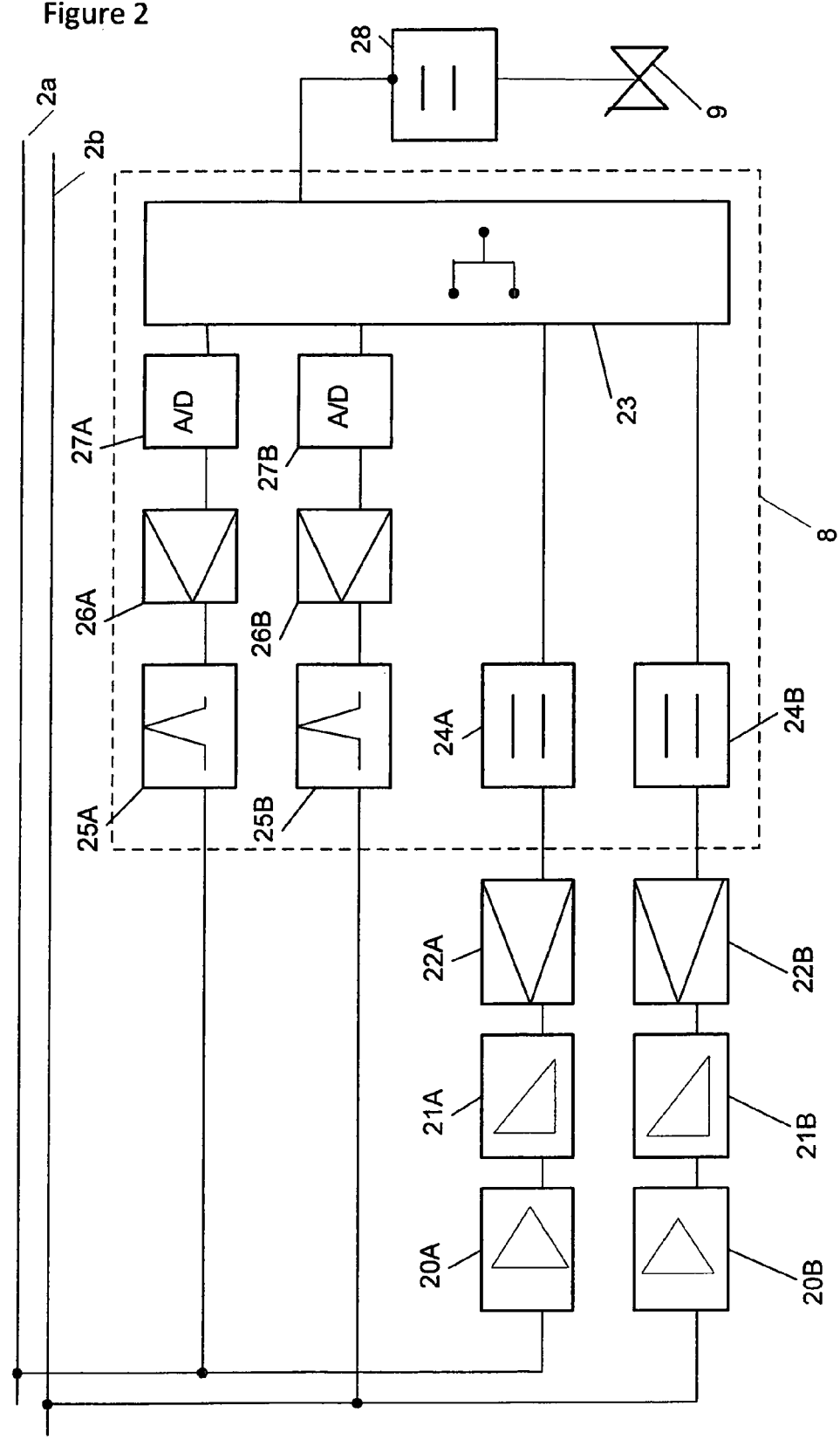
FIG. 2 is a schematic diagram in greater detail of part of the system shown in FIG. 1.

FIG. 2 shows the relevant parts of the subsea control module M-1 in greater detail. The other subsea control modules operate similarly.

The subsea control module M-1 receives the data communication signals from the A communication channel and the B communication channel. The A channel signals and the B channels are received by a respective communication device 20A or 20B, which performs any necessary decoding and processing required for a respective controller 21A or 21B, which provides by way of a respective drive circuit 22A or 22B drive signals for controlling the valve (as explained with reference to FIGS. 4 and 5). The drive signals are applied to logic gates 23 via a respective 'input conditioning' stage 24A or 24B which provides drive signals with the appropriate physical characteristics (logic convention, voltage level and suchlike) suitable for the logic gates.

The tone signals from the A and B lines are separated from any other signals on the lines by respective 'bypass' filters 25A and 25B, amplified in a respective gain stage 26A or 26B and converted to respective digital signals by stages 27A or 27B respectively. These digital signals are input to the logic gates 23.

The operation of the logic gates 23 will be described with reference to FIGS. 4 and 5. The logic gates produce by way of an output conditioning stage 28 a signal which determines the state of a fail-safe device (e.g. a fail-safe valve 9). Preferably this signal is active to maintain the valve in an open state and the valve is closed if this signal is inactive.

Figure 3:
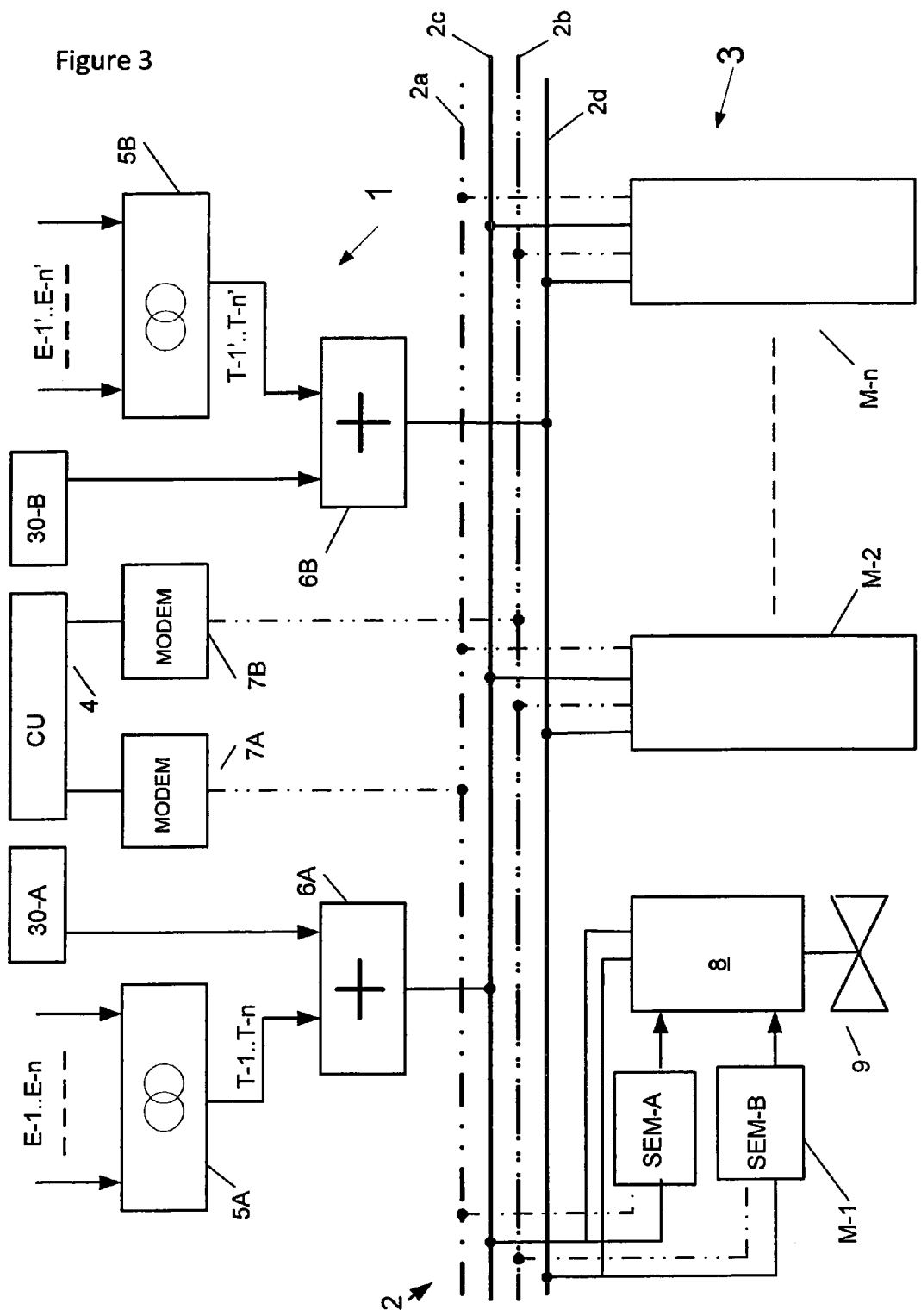
FIG. 3 is a schematic diagram of a safety system according to the invention.

FIG. 3 illustrates schematically another embodiment of the safety system. In this embodiment, so far as the data communication signals are concerned the system is the same as that described with reference to FIG. 1 but in this embodiment the safety signals are conveyed on the same transmission lines that carry the power signals to the subsea electronic modules SEM-A and SEM-B in each subsea control module M-1 to M-n.

More particularly, the control unit 4 of previous mention is coupled to the transmission lines 2a and 2b of the umbilical 2 by way of the modems 7A and 7B. These lines provide the A and B communication channels with the respective subsea electronic module SEM-A and subsea electronic module SEM-B in each of the subsea control modules. The format and coding of the data communication signals may be as previously described.

The umbilical in this embodiment includes transmission lines 2c and 2d which convey electrical power to the subsea electronic modules SEM-A and SEM-B respectively in each of the subsea control modules M-1 to M-n. Electrical power for the line 2c is provided by a topside power unit 30-A and electrical power for the line 2d is provided by a power unit 30-B. The power signals may be either direct or alternating current. As in the previously described embodiment, the topside equipment includes two tone generators 5A and 5B which provide a multiplicity of tones T-1 to T-n and T-1' to T-n', preferably a respective tone for each of the n subsea control modules. These tones need to be in a frequency range separate from the frequency (which may be zero) of the power signals so that they may be separated at the subsea control modules. They may be in the same frequency range as before and separated similarly. The tone signals are superimposed on the respective power line by means of a respective combiner 6A or 6B.

The subsea control modules in FIG. 3 are organized in the same manner as those in FIG. 1 except that that the input stages 20A and 20B and the bypass filters 25A and 25B are connected to the power lines 2c and 2d rather than the communication lines 2a and 2b.

In FIG. 3 the communication lines and the connections of the modules M-1 to M-n to them are shown as chain lines.

The provision of multiple channels (e.g. the A and B channels described) allows redundancy in either the safety signals or drive signals from the subsea electronic modules or both.

Figure 4:
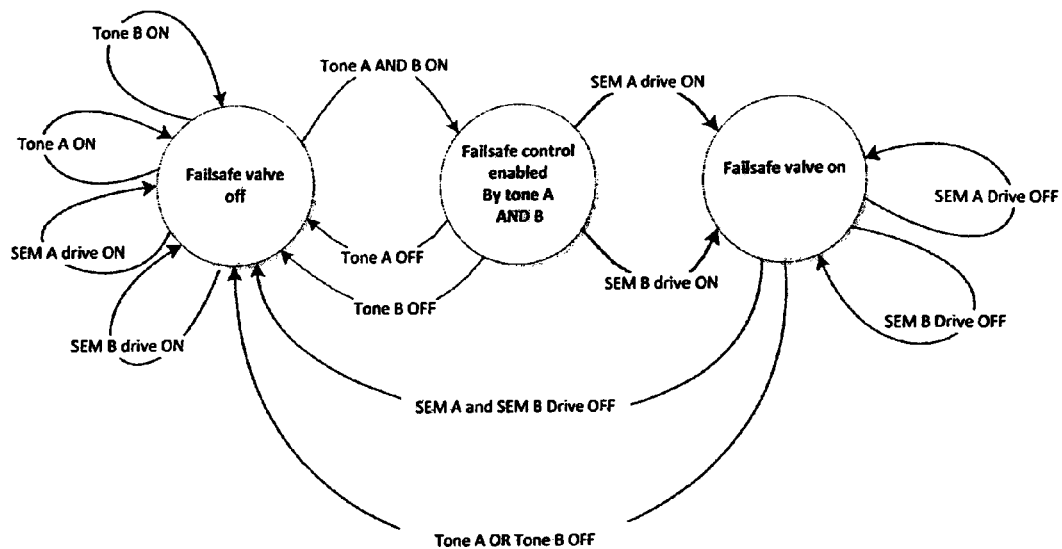
FIG. 4 is a state diagram for one form of logic controlling a fail-safe valve.

FIG. 4 is a state diagram which defines one example of the operation of the logic gates controlling the actuator for the fail-safe valve. There are three principal states. They are a 'fail-safe valve off' state (when the drive signal for the valve's actuator is inactive and the valve is closed); an 'enabled' state and a 'fail-safe valve on' state wherein the drive signal for the valve's actuator is active and the valve is open. For brevity these states will be termed 'OFF', 'ENABLED' and ON respectively.

In this version of the logic, a transition from the OFF state to the ENABLED state requires the active presence of the respective tone from both sources; in other words tone A and tone B must both be ON. Transition from the ENABLED state to the ON state requires a drive signal (SEM A or SEM B) from one or other of the subsea electronic modules. Thus the ON state may be reached despite power failure in either one of the subsea electronic modules. As previously noted, in the ON state the fail-safe valve is held open, allowing (for example) hydraulic pressure to directional control valves and opening process valves (typically in a production tree).

In this example transition from the ON state to the OFF state (in which the fail-safe valve is automatically closed) occurs if either of the tone signals to be inactive. There is also reversion from the ON state to the OFF state if both the drive signals SEM A and SEM B are 'off'. In this example therefore there is no redundancy in the safety signals but redundancy in the drive signals.

Figure 5:
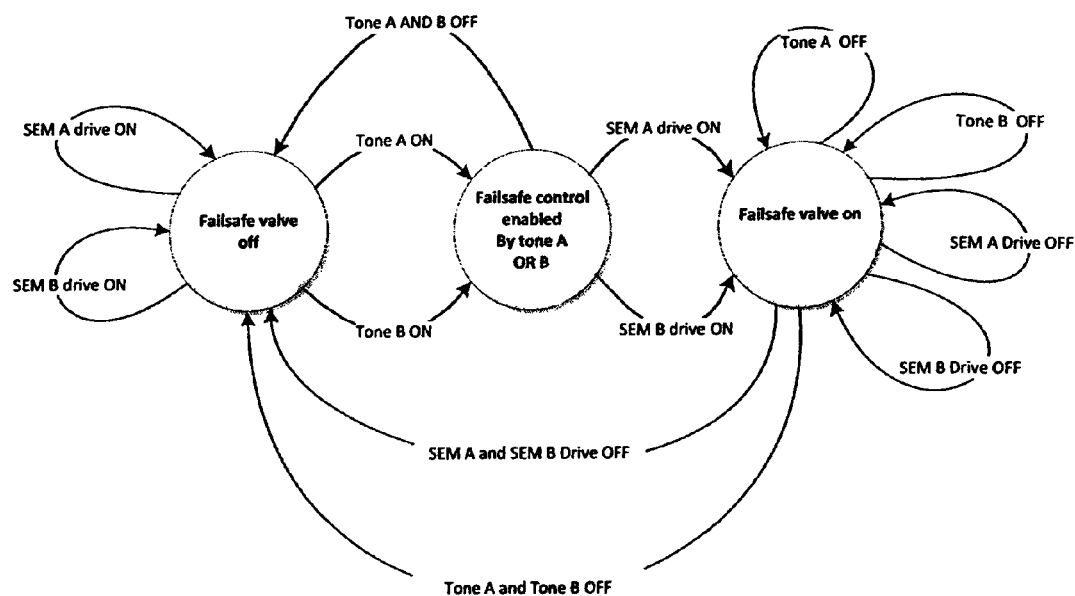
FIG. 5 is a state diagram for another form of logic controlling a fail-safe valve.

FIG. 5 is a state diagram for another version of the logic gates. This has redundancy in the tone signals and the drive signals. In particular, transition from the ON state to the ENABLED state requires either tone A or tone B to be active. Transition thence to the ON state requires either of the drive signals SEM A and SEM B from the subsea electronic modules to be active. However, the logic transitions to the OFF state if both the safety signals (the respective tone signals) are inactive. There will also be a transition from the ON state to the OFF state if both the respective drive signals are inactive.

The invention claimed is:

1. A subsea system comprising:
   a multiplicity of subsea installations;
   a first common transmission line configured to convey first electrical signals to the subsea installations, the system also being configured to convey on the common transmission line a plurality of safety signals in the form of tones separate in frequency from each other and from the said first electrical signals;
   a first bypass filter at each subsea installation arranged to selectively receive from said first common transmission line a respective one of the safety signals for control of a fail-safe device in the installation;
   a second common transmission line configured to convey second electrical signals to the subsea installations, wherein the system is also configured to convey on the second common transmission line a plurality of second safety signals in the form of tones separate in frequency from each other and from the said second electrical signals,
   at least a second bypass filter at each subsea installation arranged to selectively receive from said second common transmission line selectively a respective one of the second safety signals for control of the fail-safe device in the installation; and
   logic gates for the control of the fail-safe device in response to the respective safety signals from the first and second transmission lines;
   wherein the logic gates are disposed to put the fail-safe device in a fail-safe condition when either of the respective safety signals is inactive.

2. A subsea system according to claim 1, wherein the first bypass filter separates the safety signals from the first electrical signals on the first common transmission line.

3. A subsea system according to claim 1, in which each subsea installation is disposed to provide at least one drive signal in response to the said first electrical signals and includes logic gates for the control of the fail-safe device in response to the drive signal and the respective safety signal.

4. A subsea system according to claim 1, in which at least the first common transmission line is incorporated into a subsea umbilical connection.

5. A subsea system according to claim 1, wherein the second bypass filter separates the safety signals from the second electrical signals on the second common transmission line.

6. A subsea system according to claim 1, further including logic gates for the control of the fail-safe device in response to the respective safety signals from the first and second transmission lines.

7. A subsea system according to claim 1 in which the logic gates are disposed to put the fail-safe device in a fail-safe condition when both of the respective safety signals are inactive.

8. A subsea system comprising:
   a multiplicity of subsea installations;
   a first common transmission line configured to convey first electrical signals to the subsea installations, the system also being configured to convey on the common transmission line a plurality of safety signals in the form of tones separate in frequency from each other and from the said first electrical signals;
   a first bypass filter at each subsea installation arranged to selectively receive from said first common transmission line a respective one of the safety signals for control of a fail-safe device in the installation;
   a second common transmission line configured to convey second electrical signals to the subsea installations, wherein the system is also configured to convey on the second common transmission line a plurality of second safety signals in the form of tones separate in frequency from each other and from the said second electrical signals, and
   at least a second bypass filter at each subsea installation arranged to selectively receive from said second common transmission line selectively a respective one of the second safety signals for control of the fail-safe device in the installation;
   wherein each subsea installation is disposed to provide a first drive signal in response to the said first electrical signals and a second drive signal in response to the said second electrical signals and includes logic gates for the control of the fail-safe device in response to the first and second drive signals and the respective safety signals from the first and second transmission lines.

9. A subsea system according to claim 8, in which the logic gates are disposed to put the fail-safe device in a fail-safe condition when either of the respective safety signals is inactive.

10. A subsea system according to claim 8 in which the logic gates are disposed to put the fail-safe device in a fail-safe condition when both of the respective safety signals are inactive.

11. A subsea system according to claim 8 in which the logic gates are disposed to put the fail-safe device in a fail-safe condition when both of the respective drive signals are inactive.

12. A subsea system according to claim 8, in which both the common transmission lines are incorporated into a subsea umbilical connection.

13. A subsea system according to claim 12, in which said electrical signals are power signals and/or data communication signals.

* * * * *